United States Patent [19]
Van Duyne et al.

[11] Patent Number: 5,742,532
[45] Date of Patent: Apr. 21, 1998

[54] SYSTEM AND METHOD FOR GENERATING FRACTIONAL LENGTH DELAY LINES IN A DIGITAL SIGNAL PROCESSING SYSTEM

[75] Inventors: Scott A. Van Duyne, Stanford; David A. Jaffe, Berkeley; Gregory P. Scandalis; Timothy S. Stilson, both of Mountain View, all of Calif.

[73] Assignee: The Board of Trustees of the Leland Stanford Junior University, Palo Alto, Calif.

[21] Appl. No.: 647,296

[22] Filed: May 9, 1996

[51] Int. Cl.$^6$ .................................................. G06F 17/17
[52] U.S. Cl. .................................................. 364/724.1
[58] Field of Search .................... 364/724.01, 724.1; 84/622; 395/2.74

[56] References Cited

U.S. PATENT DOCUMENTS

| | | | |
|---|---|---|---|
| 4,726,067 | 2/1988 | Alonso | 381/106 |
| 5,432,296 | 7/1995 | Takeuchi et al. | 84/661 |
| 5,500,486 | 3/1996 | Smith, III | 84/622 |
| 5,583,309 | 12/1996 | Fujita | 84/622 |

OTHER PUBLICATIONS

Vesa Valimake, et al., "Elimination of Transients in Time-Varying Allpass Fractional Delay Filters with Application to Digital Waveguide Modeling", ICMC Proceedings 1995, pp. 327-334.

David A. Jaffe, et al., "Performance Expression in Commuted Waveguide Systhesis of Bowed Strings", ICMC Proceedings 1995, pp. 343-346.

*Primary Examiner*—Tan V. Mai
*Attorney, Agent, or Firm*—Gary S. Williams; Flehr Hohbach Test Albritton & Herbert LLP

[57] ABSTRACT

A sampled data, non-integer delay line interpolation structure includes a sampled data delay line, two allpass filters, each having an associated read pointer for reading data at a corresponding integer position of the delay line, an alternating crossfader that alternatingly crossfades between the outputs of the two allpass filters, plus a controller that controls when the read position of each allpass filter is updated and also controls when the filter coefficient of each allpass filter is updated. A specified delay length value is sampled by the controller each time the crossfade orientation of the alternating crossfader is changed, and from that value the controller generates a new read pointer and filter coefficient for allpass filter to which the structure will next crossfade. The new read pointer is an integer that corresponds to an integer portion of the specified delay length, and the filter coefficient corresponds to a fractional portion of the specified delay length. After updating the read pointer and filter coefficient of one allpass filter, the alternating crossfader outputs the signal generated by the other allpass filter for a first number of sample periods until the updated filter "warms up." Then the alternating crossfader crossfades to the signal generated by the updated allpass filter over a second number of sample periods. At the end of the crossfade operation the specified delay line length is sampled again, the reader position and filter coefficient of the other allpass filter is updated, and then the crossfade operation repeats.

15 Claims, 4 Drawing Sheets

SYSTEM AND METHOD FOR GENERATING FRACTIONAL LENGTH DELAY LINES IN A DIGITAL SIGNAL PROCESSING SYSTEM

The present invention relates generally to digital signal processing for generating music and other digitally sampled signals, and particularly to the use of delay lines having non-integer lengths in digital signal processing systems and methods.

BACKGROUND OF THE INVENTION

The development of high quality Digital Waveguide, Karplus-Strong, and Commuted Synthesis musical instrument synthesis techniques requires the use of delay lines with non-integer lengths in a feedback loop arrangement. Required features of these delay lines are:

The delay line lengths must be smoothly variable by some controlling signal in order to model pitch bend, glissando, and vibrato effects. Pitchbend is a required feature for all instruments complying with the general MIDI standard.

The delay lines must have a flat unity gain frequency response to minimize energy loss in the feedback loop. Musical notes generated by a resonating feedback loop containing a delay line that does not have a unity gain frequency response may exhibit undesirable energy loss and decay away too quickly.

No standard methods for interpolation of non-integer length delay lines are generally known that have both of these required features. Referring to FIG. 1, there is shown a "Karplus-Strong delay line" 50 that includes a sampled data delay line 52, a linear interpolation filter 54, and a feedback path 56. The sampled data delay line 52 stores one digitally sampled data value for each sampling period. For instance, if the system in which the delay line 50 is used has a sampling rate $f_s$ of 44,100 Hz, then a new data sample is inserted into the delay line 44,100 times per second. If data is simply read from the delay line at specified reader position R, producing an output signal denoted as $U_R(n)$, then the delay line is said to be an integer length delay line, because the output signal $U_R(n)$ is delayed by an integer number of sampling periods from the time it was input into the delay line.

In the Karplus-Strong delay line 50, a linear interpolation is performed so as to produce a delay line having a fractional length of L+a0, where L is an integer and a0 is a fractional value between 0 and 1. L is the distance, in units of data sample positions, between the current input position W to the delay line and the filter's reader position, R−1, during the prior sample period:

$$L = R - 1 - W$$

During each time period, n, the filter 54 reads a sampled data value $U_R(n)$ and outputs a filtered data value out(n) that is computed as follows:

$$\text{out}(n) = a0 \times U_R(n) + (1-a0) \times U_R(n-1).$$

For example, if a0 is set equal to 0.5, the delay line has an effective length of L+0.5, and out(n) is equal to the average of the two data samples most recently read by the filter:

$$\text{out}(n) = 0.5 \times (U_R(n) + U_R(n-1)).$$

Non-integer length delay lines such as the Karplus-Strong delay line 50 that use linear interpolation, or other FIR (finite impulse response filter) interpolation methods, can be varied smoothly in length by a control signal (e.g., a0 in the delay line shown in FIG. 1), but they have unsatisfactory energy losses caused by the FIR interpolation filter itself in high frequency (short delay length) loops. This causes high pitched musical notes to decay away too quickly. For instance, when the control coefficient a0 is set to 0.5 in the Karplus-Strong delay line 50, the filter 54 acts as a low-pass filter with a cut-off frequency of half the sampling rate and also substantially attenuates frequency components of the loop signal that are close to the cut-off frequency.

On the other hand, standard allpass filter interpolation solves this problem for the static case (i.e., where the reader position and filter coefficients remain constant). See David A. Jaffe and Julius O. Smith III, "Extensions of the Karplus-Strong Plucked-String Algorithm", Computer Music Journal 7(2): 56–69, 1983 (hereinafter "Jaffe and Smith 1983"). FIGS. 2 and 3 show a delay line with an allpass filter interpolator 70. This delay line 70 includes a sampled data delay line 52, an allpass interpolation filter 72, and a feedback path 56. As shown in FIG. 3, the allpass filter 72 includes two adders 74, 75, one multiplier 76 and two unitary delay elements 77, 78. During each time period, n, the allpass filter 72 reads a sampled data value $U_R(n)$ and outputs a filtered data value out(n) that is computed as follows:

$$\text{out}(n) = U_R(n-1) + AP\_COEF \times (U_R(n) - \text{out}(n-1)).$$

So long as the position of the delay line read pointer for the allpass filter 72 remains unchanged, and the filter coefficient AP_COEF remains unchanged, this filter preserves the energy in the sampled loop signal. However, when implementing pitch bend, glissando, or vibrato effects, the allpass filters in delay lines using allpass filter interpolation introduce undesirable artifacts, such as audible clicks. This is primarily due to the internal state in the filter 72, which must be handled carefully when changing the filter's coefficient and/or the position of the delay line read pointer. Until now it has been necessary to chose between unity gain in loops (using allpass filter interpolation) and flexibility of loop length control (using linear filter or FIR filter interpolation).

It is therefore a goal of the present invention to provide a new delay line interpolation structure that has the time-varying delay-length flexibility of simple linear interpolation of a delay line, while retaining the energy conserving effects and quality of static allpass interpolation.

Another object of the present invention is to provide a delay line interpolation structure that is computationally efficient.

SUMMARY OF THE INVENTION

In summary, the present invention is a sampled data, non-integer delay line interpolation structure that includes a sampled data delay line, two allpass filters, each having an associated read pointer for reading data at a corresponding integer position of the delay line, an alternating crossfader that alternatingly crossfades between the outputs of the two allpass filters, plus a controller that controls when the read positions of each allpass filter is updated and also controls when the filter coefficient of each allpass filter is updated.

The controller receives a control signal indicating a specified delay line length that is to be implemented by the delay line interpolation structure. The specified delay length is sampled by the controller each time the crossfade orientation of the alternating crossfader is changed, and from that value the controller generates a new read pointer and filter coefficient for allpass filter to which the structure will next crossfade. The new read pointer is an integer that corresponds to an integer portion of the specified delay length, and the filter coefficient corresponds to a fractional portion of the specified delay length. After updating the read pointer and filter coefficient of one of the two allpass filters, the alternating crossfader outputs the signal generated by the other allpass filter for a first number of sample periods until the updated filter "warms up." Then the alternating crossfader crossfades to the signal generated by the updated allpass filter over a second number of sample periods.

At the end of each crossfade operation, at which point the crossfader has crossfaded completely or almost completely to the signal generated by one of the allpass filters, the specified delay line length is sampled again, the reader position and filter coefficient of the other allpass filter are updated, and then the crossfade operation repeats.

By providing a warm up period after each filter update, the generation of transient signals unrelated to the signal in the delay line is avoided.

Furthermore, the technique of gradually crossfading between two allpass filters preserves the energy of the signals in the delay line while providing smooth transitions from one delay line length to another.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 4:
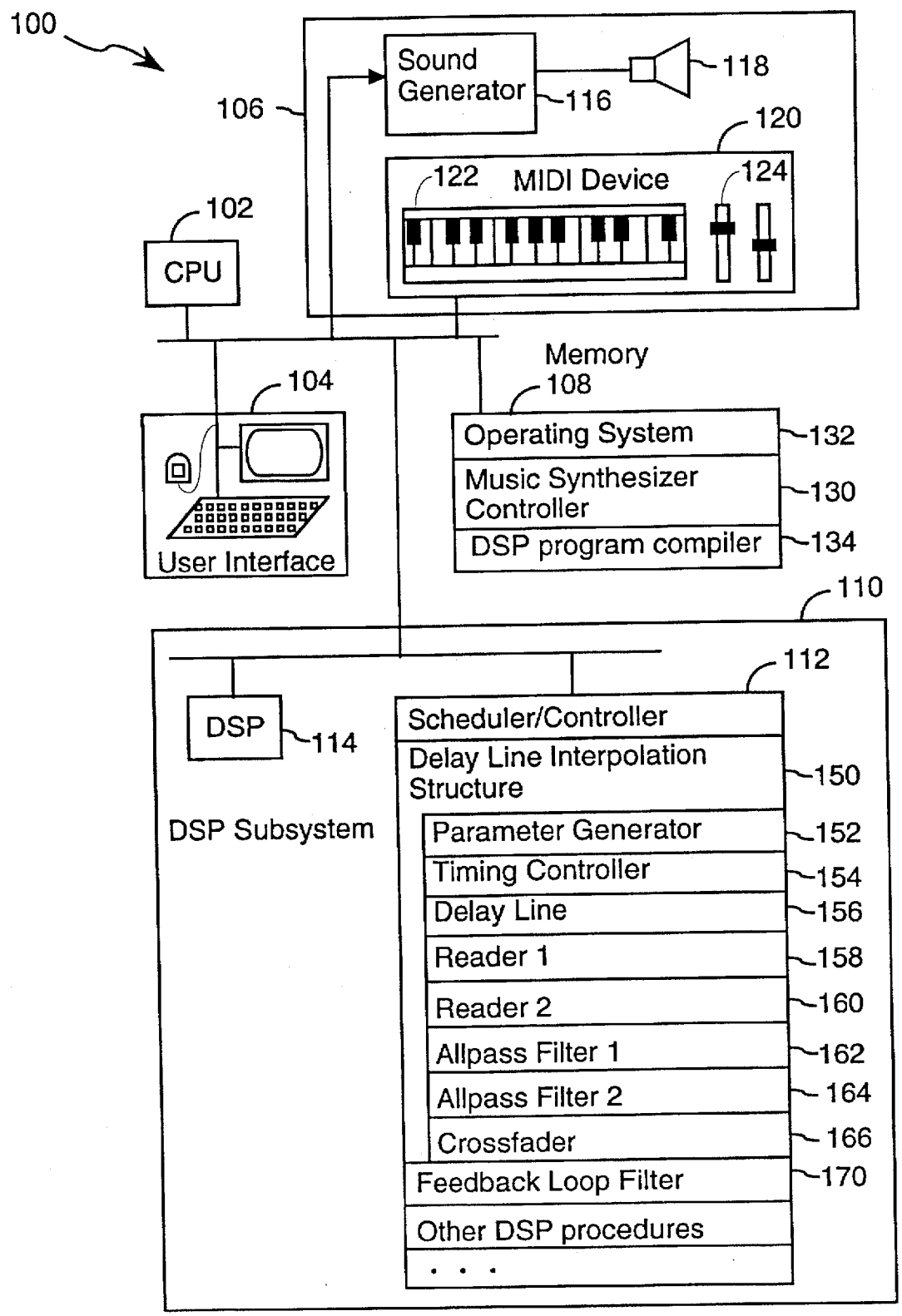
FIG. 4 is a block diagram of a computer system implementing a preferred embodiment of the present invention.

Referring to FIG. 4, there is shown a computer-based music synthesis system 100 having a host CPU 102, a computer user interface 104, a music interface 106, memory 108 (including fast random access memory and non-volatile memory such as disk storage), and a digital signal processor (DSP) subsystem 110.

The DSP subsystem 110 executes DSP programs downloaded by the host CPU 102 into the DSP subsystem's memory 112. The downloaded DSP programs typically are music synthesis programs that, when executed by the DSP subsystem's processor 114 (typically called a DSP), generate audio frequency signals. Those output signals constitute a stream of digital data values that are converted by a sound generator 116 (in the music interface) into analog electrical signals that are then converted into audible sound by a speaker 118. Control signals used by the DSP 114 when executing the DSP programs can originate from a MIDI device 120, such as a device having a keyboard 122 and one or more pitch blend wheels 124, of from a computer keyboard or pointing device in the computer user interface 106. Input signals from these input devices are typically pre-processed by the host CPU 104 through the execution of a music synthesizer control program 130 to produce a control parameter that is then passed to the DSP subsystem 110.

In addition to the music synthesizer control program 130, the host CPU's memory 108 also will typically store an operating system 132, a DSP program compiler 134, as well as other software and data that are not directly relevant to the present discussion.

Figure 5:
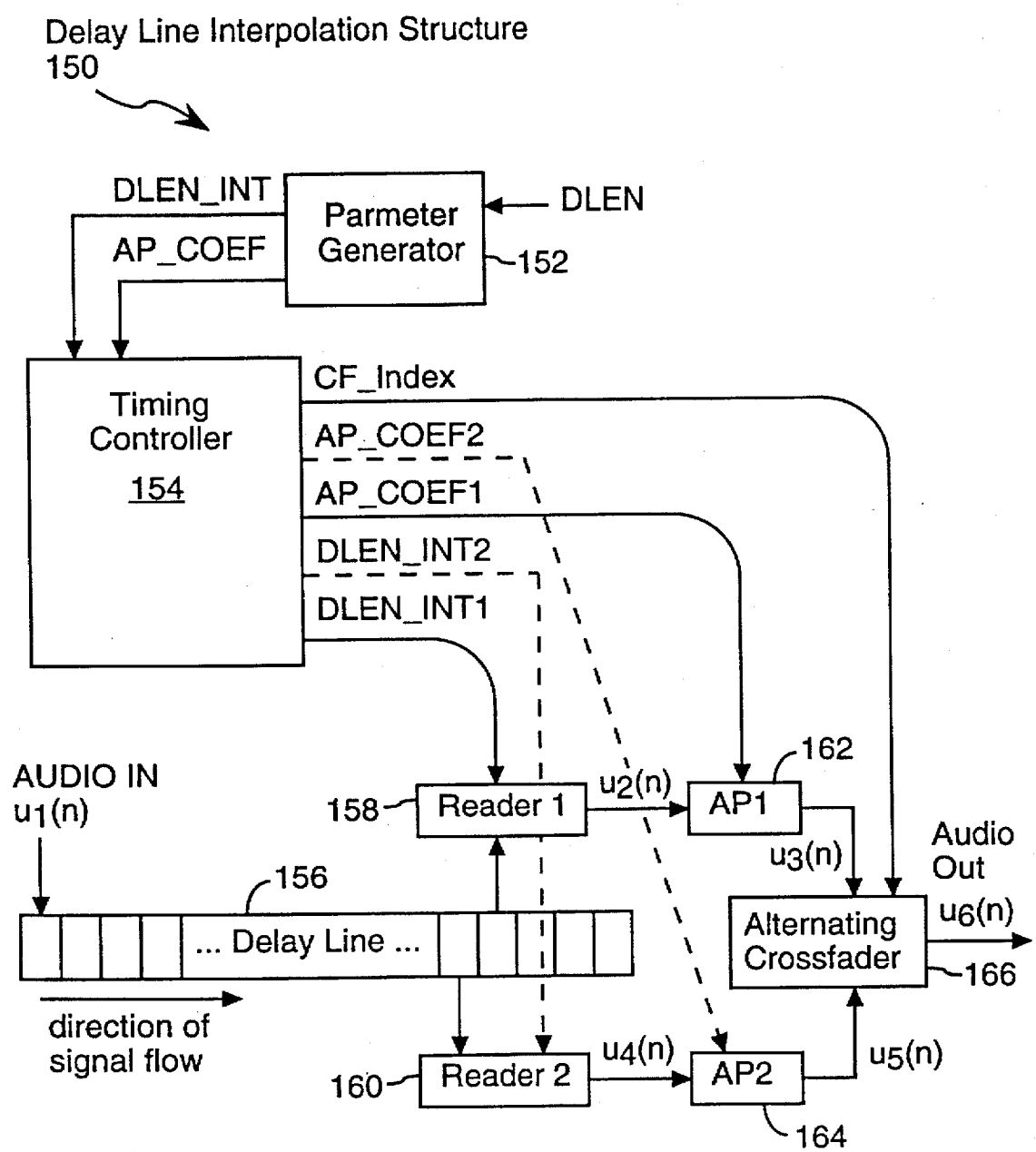
FIG. 5 is a schematic representation of a delay line with a preferred embodiment of the dual allpass filter interpolator with alternating crossfader of the present invention.

The memory 112 in the DSP subsystem 110 typically stores compiled DSP procedures 150, 170, and a scheduler or controller program 140 that schedules the execution of all the DSP procedures 150, 170 being executed by the DSP 114. The only one of those DSP procedures that is directly relevant to the present invention is the delay line interpolation structure procedure 150, which is schematically represented in FIG. 5.

While for ease of explanation the delay line interpolation structure 150 will be discussed as though it were a physical electronic circuit, it is in fact generally implemented as a DSP program or procedure. Actual music synthesis systems using the present invention will typically use delay line interpolation structures 150 wherever delay lines of non-integer length are needed, and thus such systems will often have a plurality of delay line interpolation structures.

The delay line interpolation structure 150 includes a parameter generator 152, a timing controller 154, a delay line 156, first and second delay line readers 158, 160, two allpass filter interpolators 162, 164, and an alternating cross fader 166. As will become clear from the discussion below, the two delay line readers 158, 160 may be considered to be part of their respective all pass filters. The parameter generator 152 and timing controller 154 may be considered to compose the delay line interpolation structure's controller.

The delay line's AUDIO IN and AUDIO OUT signals, which are also labeled u1(n) and u6(n), respectively, are the input and output audio signal to and from the delay line 156. These signals are updated at the audio sampling rate, for example 44,100 Hz or 22,050 Hz. In the preferred embodiment the audio sampling rate is 44,100 Hz.

DLEN is the input signal that controls the fractional delay line length. This signal may operate at the audio sampling rate, at some slower control rate, or at any asynchronous rate. It may be pre-processed to the desired control rate, or just left to the timing controller 154 to synchronize with the audio signal rate.

The signals marked u1(n), u2(n), . . . ,u6(n) are internal signals; n is the audio sampling index. Thus, u1(n) represents the value of signal u1 at time sample period n, while u1(n−1) represents the value of signal u1 at time sample period n−1.

For the purposes of explaining the operation of the preferred embodiment of the present invention, we will assume that the host CPU 104 receives a pitch signal $f_{BW}$ from one of the pitch blend wheels 124 and generates a "delay length" value DLEN that is equal to the DSP subsystem's data sampling rate (typically 44,100 Hz) divided by the pitch signal:

$$DLEN = \text{sampling rate/pitch}$$
$$= 44,100/f_{BW}$$

For instance, if $f_{BW}$ is equal to 220 Hz, then DLEN is equal to 200.4545 samples.

The parameter generator 152 converts the delay length value DLEN received from the host CPU into an associated integer value DLEN_INT and a filter coefficient AP_COEF. As indicated, DLEN is a real number that may not be an integer.

For the purposes of this document, the term "crossfade" is defined to mean combining two signals so as to smoothly transition from one signal to the other. For instance, given two signals S1 and S2, a crossfade signal CF may be defined as:

$$CF = \alpha \cdot S1 + (1-\alpha) \cdot S2$$

where $\alpha$ is the "crossfade" coefficient. As $\alpha$ is smoothly transitioned in value from 0 to 1, the signal CF crossfades (i.e., smoothly transitions) from a value corresponding to S2 to a value corresponding to S1.

Figure 1:
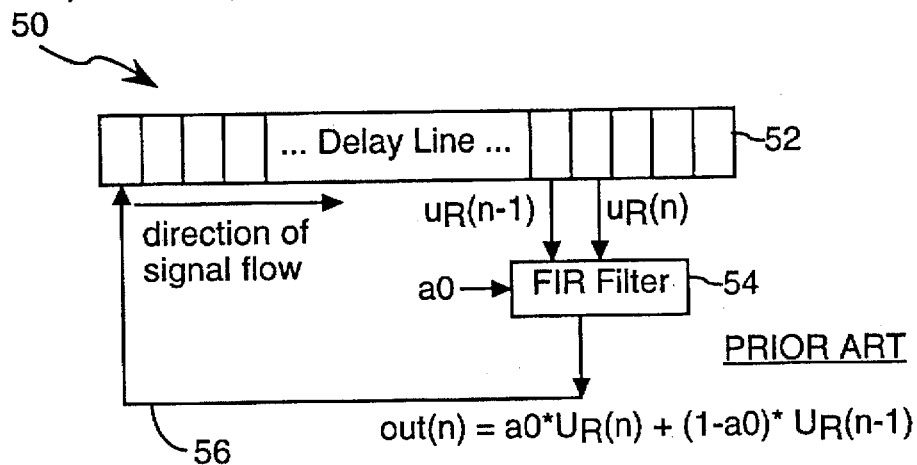
FIG. 1 is a schematic representation of a delay line with a linear interpolator filter.
Figure 2:
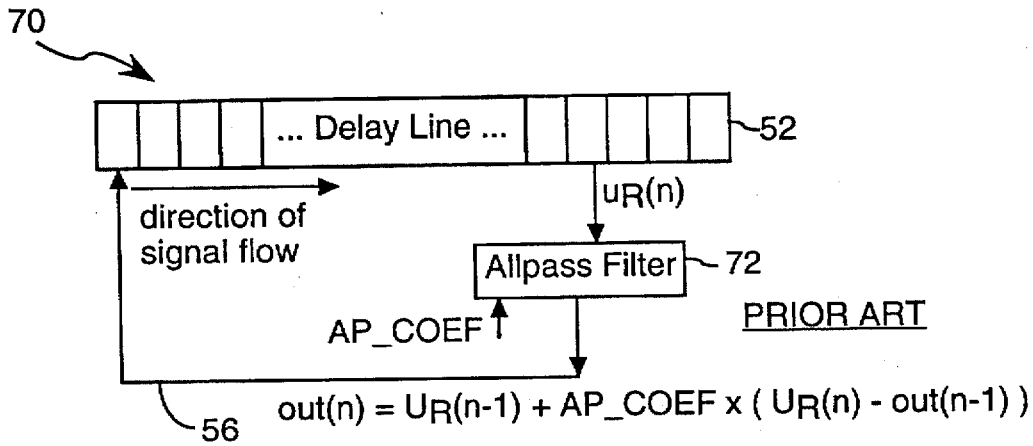
FIG. 2 is a schematic representation of a delay line with an allpass filter interpolator.

The delay line 156, as described above with reference to FIG. 1, stores and delays a digital audio signal by an integral number of time samples. The integer number of time sample delays is determined by the read pointer positions of reader 1 and reader 2. The delay line is generally formed by the combination of sequential data memory locations and an addressing scheme constructed such that an audio signal sample may be stored in the memory and read back out at a specified number of integral time samples later. The delay line data structure is constructed in the preferred embodiment such that there may be more than one reader, and such that the delay time intervals (i.e., read pointer positions) associated with each reader may be changed arbitrarily whenever the timing controller 154 indicates that a crossfade orientation change must occur. In the preferred embodiment, the delay line is implemented using a circular buffer design (i.e., an array of memory locations) with separate read and write pointers.

In the preferred embodiment, the read pointer positions of the readers changes no more frequently than every T samples, where T is the minimum crossfading time interval allowed. For instance, when T is set to 16, alternating ones of the read pointer positions are updated no more frequently than every 16 sample periods.

The delay line 156 in combination with reader 1 delay the AUDIO IN signal by DLEN_INT1 time samples as follows, $$u2(n) = u1(n-\text{DLEN\_INT1})$$

The delay line 156 in combination with reader 2 delay the AUDIO IN signal by DLEN_INT2 time samples as follows, $$u4(n) = u1(n-\text{DLEN\_INT2})$$

The first allpass filter AP1 is a standard first order allpass filter, the output of which may be computed in a variety of ways that are generally known, in particular by the following difference equation, $$u3(n) = AP\_COEF1 \times u2(n) + u2(n-1) - AP\_COEF1 \times u3(n-1)$$

The second allpass filter AP2 is also a standard first order allpass filter, the output of which may be computed in a variety of ways that are generally known, in particular by the following difference equation, $$u5(n) = AP\_COEF2 \times u4(n) + u4(n-1) - AP\_COEF2 \times u5(n-1)$$

The parameter generator 152 takes a positive non-integer delay line length input value, DLEN, and converts it to a integer part, DLEN_INT, and a fractional part, DLEN_FRAC, which may be greater than 1.0. DLEN_INT is used to set the length of an integer length delay line, while DLEN_FRAC is converted to the appropriate allpass filter coefficient, AP_COEF, to implement the fractional delay portion as a first order allpass filter. The integer delay line and the first order allpass filter cascaded together then implement the non-integer delay line length, DLEN.

It is known that a first order allpass filter may be used to implement fractional delays. The first order allpass filter may be computed by the following difference equation, which is equivalent to equations for the allpass filters shown above:

$$\text{Output}(n) = AP\_COEF \times \text{Input}(n) + \text{Input}(n-1) - AP\_COEF \times \text{Output}(n-1),$$

where Input(n) and Output(n) are the time sample indexed input and output signals to the allpass filter, respectively, and AP_COEF is the allpass filter coefficient.

There are a variety of methods for generating the exact or approximated allpass filter coefficient for a desired fractional delay length. Jaffe and Smith (1983) note that $$AP\_COEF = (1-\text{DLEN\_FRAC})/(1+\text{DLEN\_FRAC})$$

makes a very good approximation the desired allpass filter coefficient to implement a fraction delay of DLEN_FRAC time samples. Since a divide operation is required in the above computation, and since divide operations are generally difficult to perform using many DSP's, in the preferred embodiment an alternative polynomial series approximation, derived from a Taylor Series expansion around the point, DLEN_FRAC=1.0, is used:

$$AP\_COEF = -0.5 \times (\text{DLEN\_FRAC}-1) + 0.25 \times (\text{DLEN\_FRAC}-1)^2 - 0.125 \times (\text{DLEN\_FRAC}-1)^3$$

Incidentally, a dedicated high-speed hardware implementation of this polynomial may be simplified since the multiplications by 0.5, 0.25, and 0.125 may be implemented in fixed-point binary arithmetic as right shifts by 1, 2, and 3 bits, respectively, thereby reducing the total number of full hardware multiplies required.

This polynomial formulation is most accurate when DLEN_FRAC is near 1.0. Therefore, in the preferred embodiment DLEN_INT and DLEN_FRAC are computed from DLEN as follows:

First, set DLEN_INT equal to the integer part of DLEN:

$$\text{DLEN\_INT} = \lfloor \text{DLEN} \rfloor$$

Second set DLEN_FRAC equal to the fractional part of DLEN, which may be computed by subtracting DLEN_INT from DLEN:

$$\text{DLEN\_FRAC} = \text{DLEN} - \text{DLEN\_INT}$$

Finally, if DLEN_FRAC is less than MINIMUM_DLEN_FRAC, which we will define below, then add 1.0 to DLEN_FRAC and subtract 1 from DLEN_INT:

If *DLEN_FRAC* < MINIMUM_*DLEN_FRAC*
{
 *DLEN_FRAC = DLEN_FRAC*+ 1
 *DLEN_INT= DLEN_INT* – 1
}

In this way we obtain DLEN_INT, an integer; DLEN_FRAC, a fractional value lying between MINIMUM_DLEN_FRAC and 1.0+MINIMUM_DLEN_FRAC; where DLEN_INT plus DLEN_FRAC is equal to DLEN.

If we chose MINIMUM_DLEN_FRAC=0.618, this constrains DLEN_FRAC to lie between 0.618 and 1.618, which in turn constrains AP_COEF to lie between −0.236 and +0.236, approximately. This keeps the allpass filter coefficient as close to 0 as possible, which in turn, minimizes the transient effects of making a discrete change in the filter coefficient while the filter is running. The inventors of the present invention have found that when the allpass filter coefficient is constrained to lie between −0.236 and +0.236, the undesirable transient effects drop more than 72 dB in only 5 time samples after a discrete coefficient change. Transient effects can continue for a much longer time if the filter coefficient is allowed to get near 1.0 or −1.0. Keeping the transient time of the filter short is desirable in order to design an effective crossfader.

The alternating crossfader 166 computes its output value from its two input values, u3 and u5, by smoothly transitioning from one to the other and back over a period of time. The process of smoothly transitioning from one signal to another is called "crossfading." T is the number of samples over which a crossfade between u3 and u5 signals is performed in the alternating crossfader 166. In one preferred embodiment, T is equal to 16.

The alternating crossfader 166 uses an ordered set of crossfader index values, which may be read from a table or generated by a computational function, that range generally between 0 and 1 and that ramp up from 0 to 1 and then down from 1 to 0 over a period time. In the preferred embodiment, the crossfader index varies from 0 to 1 and back to 0 over a period of 32 sample periods as follows:

| | |
|---|---|
| $CF\_Index(x) = 0$ | $x = 0$ to 4 (i.e., first 5 sample periods) |
| $CF\_Index(x) = 0.0909 \times (x - 4)$ | $x = 5$ to 15 (i.e., next 11 sample periods) |
| $CF\_Index(x) = 1$ | $x = 16$ to 20 |
| $CF\_Index(x) = 1 - 0.0909 \times (x - 20)$ | $x = 21$ to 31 |

The alternating crossfader computes its output value from its two input values, u3 and u5, according to the following difference equation:

$$u6(n) = CF\_Index(n-T0) \times u3(n) + [1 - CF\_Index(n-T0)] \times u5(n).$$

Figure 6:
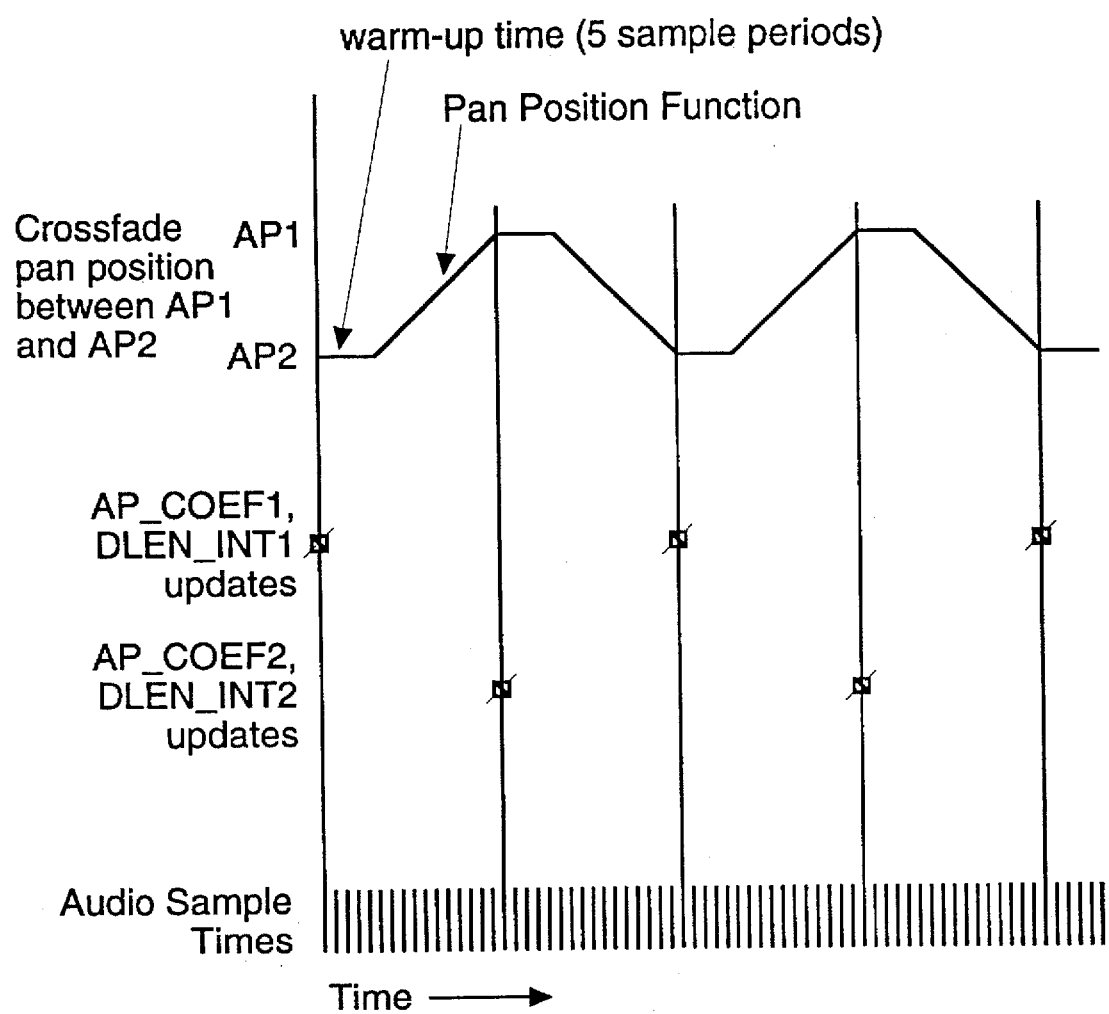
FIG. 6 is a timing diagram representing the operation of the alternating crossfader in a preferred embodiment of the present invention.

A timing diagram of the crossfader output is shown in the top portion of FIG. 6.

T0 is the time index when the crossfader last began a crossfade cycle, so that n−T0 counts from 0 beginning at the time when the current crossfade cycle began, and $CF\_Index$ (n−T0) reads out sequential values from the crossfade index table or function starting from the first value in the table whenever a crossfade cycle begins.

The crossfade "orientation" changes at the middle of the crossfade cycle, crossfading back and forth between signals u3 and u5 at a rate determined by the timing controller 154.

The timing controller 154 updates the control parameters of the two readers 158, 160 and the two allpass filters AP1 and AP2 and synchronizes these parameter updates with the crossfade orientation of the alternating crossfader 166. The timing controller 154 determines when it should initiate a new crossfade cycle. This determination can be based on a regular clock, or some other triggering method that is synchronized with the audio sampling rate. One useful method is to initiate a change in the crossfade orientation every T audio samples. In practice, T=16 (i.e., a crossfade cycle of 32 sample periods, with the crossfade orientation changing every 16 sample periods) for a system with a sampling rate of 44,100 Hz is reasonable for handling reasonably fast pitch bend, glissando, and vibrato effects.

When it is determined that a crossfade orientation change is to be made (e.g., whenever the sampling index n, modulo 32, is equal to 0 or 16), the current values of DLEN_INT and AP_COEF, as computed by the parameter generator 152, are sent to the appropriate reader and allpass filter. If reader 1 and allpass filter AP1 were updated the last time an update was made, then reader 2 and allpass filter AP2 will be updated the next time, and vice versa. When reader 1 and allpass filter AP1 are "updated," that means that the current value of DLEN is read by the parameter generator 152, which then updates the values of DLEN_INT and AP_COEF accordingly, and then DLEN_INT1 is set to the current value of DLEN_INT and that AP_COEF1 is set to the current value of AP_COEF by the timing controller 154.

Similarly, when reader 2 and allpass filter AP2 are updated, that means that the current value of DLEN is read by the parameter generator 152, which then updates the values of DLEN_INT and AP_COEF accordingly, and then DLEN_INT2 is set to the current value of DLEN_INT and that AP_COEF2 is set to the current value of AP_COEF.

Figure 3:
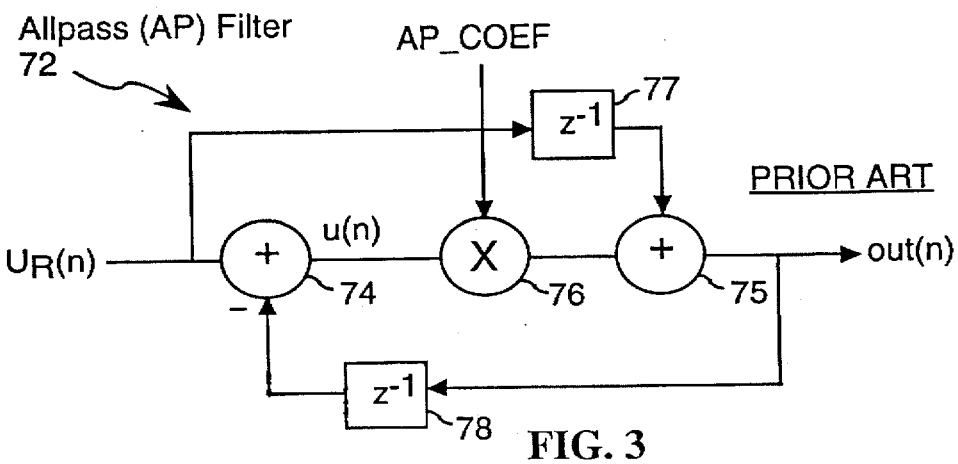
FIG. 3 is a schematic representation of an allpass filter.

Referring to FIG. 3, it can be seen that an allpass filter contains an internal state, which consists of the last computed values of u(n) and out(n). That is, when computing the next value of out(n), that output value is a function of the prior sample period's values for u(n) and out(n).

Referring to FIGS. 3 and 6, when the reader position (e.g., DLEN_INT1) for an allpass filter (e.g., allpass filter AP1) is suddenly changed, as happens to one of the allpass filters whenever the timing controller 154 performs a crossfade orientation change, the internal state of the allpass filter is likely to be inconsistent with the new input data it is receiving. That is, the internal state of the allpass filter at the current time T is not the same as it would have been if the allpass filter had always been receiving data from the new reader position. Over the next several sample periods after the reader position change, the internal state of the allpass filter transitions to a state that is consistent with the data at the new reader position. This adjustment period is called the "transient time." The inventors have determined that when the allpass filter coefficient is kept between −0.236 and +0.236 (corresponding to MINIMUM_DLEN_FRAC= 0.618), the transient time of the allpass filter state is only about five time samples. That is, about five time sample periods after a reader position change, the internal state of the associated allpass filter is very close to what it would have been had the allpass filter always been receiving data from the new reader position.

If the output signal generated by the allpass filter were to be used to drive an audio speaker during the transient time, the output signal would typically include a high frequency "click" sound. To avoid this, the crossfade index used by alternating crossfader in the preferred embodiment is set so that during each allpass filter's transient time, the output of the crossfader is produced entirely, or almost entirely by the other allpass filter.

The overall effect of synchronizing the updating of alternate ones of the reader and allpass filter parameters with the alternating crossfader, is to crossfade gradually into the output of the last updated reader and allpass filter output signal (either u3 or u5), and also to give the last updated reader and allpass filter several sample periods to "warm up" before the alternating crossfader begins to crossfade over to the output of that allpass filter.

The internal state of each allpass filter is not reset or otherwise modified when its read pointer and filter coefficient are updated. The "warm up" period allows start-up filter transients to die away sufficiently as to make a smooth crossfade into the new fractional delay line length. The careful crossfading back and forth every T audio samples (say every 16 samples) between the allpass filtered reader outputs allows the smooth signal control of the fractional delay length without energy loss.

FIG. 6 illustrates the overall effect of the timing controller 154 and alternating crossfader 166. Essentially the alternating crossfader 166 pans back and forth between the two separate reader and allpass filter mechanisms. When a reader/allpass filter mechanism is given a parameter update, its output is ignored for a certain warm up time, after which the alternating crossfader 166 pans over to it.

In designing the crossfade index table or function and the crossfade orientation alternation time, the following observations may be useful. A series of crossfades between notes that are within a just noticeable difference (JND) of each other will be perceptually indistinguishable from a smooth glissando. There are approximately 100 JND steps in an octave, depending on the register. Also, if we use allpass filter coefficients between −0.236 and +0.236 (corresponding to MINIMUM_DLEN_FRAC=0.618), the transient time of the allpass filter state is only about five time samples.

The alternating crossfade time between readers must be fast enough, yet slow enough such that: (1) all pitch changes in the feedback delay line loop resonator are small enough so as to be indistinguishable from a smooth glissando; (2) the first portion of the crossfade ramp after each orientation change is long enough (e.g., five samples) for the allpass filters to have time to "warm up" so that the initial state of the allpass filters may be set arbitrarily; and (3) the ramping up portion of the crossfade ramp is of long enough duration to round out any artifacts from the phase discontinuity between the outputs of the two allpass filters. If these three conditions are met well, it is still possible to simulate sufficiently fast glissando rates without exceeding the limits imposed by the preferred maximum pitch step size, the allpass transient length, and preferred maximum ramping up (actual crossfading) time.

In a second preferred embodiment, the timing controller has two modes of operation, depending on the amount by which the DLEN value changes between samplings of that signal. When the DLEN value changes only a small amount (e.g., less than 4 samples) from its previous value, a first mode of operation having a crossfade half cycle of 16 sample periods (i.e., about 0.36 milliseconds) is used, as described above. This type of operation is typical when DLEN is controlled by a pitch wheel, slider, or any similar device.

When the DLEN value is controlled by a musical keyboard, the DLEN value received by the delay line interpolation structure is a function of the fundamental frequency associated with the particular key that has been pressed. As a result, each time a key is pressed, the DLEN value will jump by a relatively large amount. When the DLEN value jumps by a relatively large amount (e.g., 4 or more samples), a second mode of operation having a longer crossfade half cycle is used, such as a crossfade half cycle of 1024 cycles.

In particular, in the second mode of operation the updated reader and allpass filter are given 5 clock cycles to warm up, and then the crossfader crossfades over to the signal generated by the updated allpass filter over 1024 sample periods (about 23 milliseconds). The resulting sound is a "legato" transition from one note to another.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A sampled data, non-integer delay line interpolation structure, comprising:
    a sampled data delay line having a multiplicity of integer positions at which data is stored;
    first and allpass filters, each having an associated read pointer for reading data at a corresponding integer position of the delay line, each allpass filter generating an associated output in accordance with a filter coefficient assigned thereto and the data read from the delay line;
    a controller that assigns to each allpass filter's read pointer a respective delay line position and assigns to each allpass filter a respective filter coefficient value, wherein the delay line position and filter coefficient assigned to each allpass filter together corresponding to a respective effective delay line position for each allpass filter; and
    a crossfader that smoothly crossfades between the outputs of the first and second allpass filters so as to generate an output signal that corresponds to a delay line read position that smoothly transitions from a first effective delay line position to a second effective delay line position.

2. The sampled data, non-integer delay line interpolation structure of claim 1, wherein:
    the crossfader smoothly and alternatingly crossfades between the outputs of the first and second allpass filters;
    the controller includes logic for (A) updating the read pointer and filter coefficient of the first allpass filter, and updating the read pointer and filter coefficient of the second allpass filter, in alternating fashion, and (B) coordinating the updating of the allpass filter read pointers and filter coefficients with operation of the crossfader so that the output signal generated by the crossfader smoothly transitions between successive effective delay line positions.

3. The sampled data, non-integer delay line interpolation structure of claim 2, wherein
    the controller alternately updates the read pointer and filter coefficient of the first allpass filter and the read pointer and filter coefficient of the second allpass filter in accordance with delay length values received from a source external to the delay line interpolation structure;
    the output signal generated by the crossfader, after the first allpass filter's read pointer and filter coefficient are updated, corresponds to the output generated by the second allpass filter for a first number of sample periods, and then crossfades from the output generated by the second allpass filter to the output generated by the first allpass filter over a second number of sample periods.

4. The sampled data, non-integer delay line interpolation structure of claim 3, wherein each of the first and second allpass filters includes an internal state, and during the first number of sample periods the first allpass filter continues to generate an output and to update its internal state.

5. The sampled data, non-integer delay line interpolation structure of claim 2, wherein
    the controller alternately updates the read pointer and filter coefficient of the first allpass filter and the read pointer and filter coefficient of the second allpass filter in accordance with delay length values received from a source external to the delay line interpolation structure; and
    the read pointer and filter coefficient for each allpass filter, when updated by the controller, correspond to an integer portion and a fractional portion, respectively, of one of the received delay length values.

6. A method of delaying digitally sampled data by a smoothly varying non-integer number of delay periods, comprising the steps of:
    storing digitized data in a sampled data delay line having a multiplicity of integer positions at which data is stored;

filtering data from the delay line with first and second allpass filters, each having an associated read pointer for reading data at a corresponding integer position of the delay line, each allpass filter generating an associated output in accordance with a filter coefficient assigned thereto and the data read from the delay line;

assigning to each allpass filter's read pointer a respective delay line position and assigning to each allpass filter a respective filter coefficient value, wherein the delay line position and filter coefficient assigned to each allpass filter together corresponding to a respective effective delay line position for each allpass filter; and smoothly crossfading between the outputs of the first and second allpass filters so as to generate an output signal that corresponds to a delay line read position that smoothly transitions from a first effective delay line position to a second effective delay line position.

7. The method of claim 6, including:

updating the read pointer and filter coefficient of the first allpass filter and updating the read pointer and filter coefficient of the second allpass filter, in alternating fashion;

the crossfading step including smoothly and alternatingly crossfading between the outputs of the first and second allpass filters, and coordinating the updating of the allpass filter read pointers and filter coefficients with the crossfading step so that the output signal generated by the crossfading step smoothly transitions between successive effective delay line positions.

8. The method of claim 7, wherein:

the updating step updates the read pointer and filter coefficient of the first allpass filter and the read pointer and filter coefficient of the second allpass filter in accordance with received delay length values; and the read pointer and filter coefficient for each allpass filter, when updated, correspond to an integer portion and a fractional portion, respectively, of one of the received delay length values.

9. The method of claim 6, wherein the updating step updates the first allpass filter's read pointer and filter coefficient, and the second allpass filter's read pointer and filter coefficient, in accordance with received delay length values;

the crossfading step including, after the first allpass filter's read pointer and filter coefficient are updated, generating an output signal corresponding to the output generated by the second allpass filter for a first number of sample periods, and then crossfading from the output generated by the second allpass filter to the output generated by the first allpass filter over a second number of sample periods.

10. The method of claim 9, including:

establishing an internal state within each of the first and second allpass filters; and updating the internal state of both the first and second allpass filters during each sample period of operation of the crossfading step, such that the internal state of the first allpass filter is updated during each of the first number of sample periods.

11. A signal processing system, comprising:

a data processor;

memory coupled to the data processor for storing data structures and instructions to be executed by the data processor;

the data structures stored in the memory including a sampled data delay line having a multiplicity of integer positions at which data is stored;

the instructions stored in the memory including:

filtering instructions implementing two allpass filters, each having an associated read pointer for reading data at a corresponding integer position of the delay line, each allpass filter generating an associated output in accordance with a filter coefficient assigned thereto and the data read from the delay line;

control instructions for assigning to each allpass filter's read pointer a respective delay line position and assigning to each allpass filter a respective filter coefficient value, wherein the delay line position and filter coefficient assigned to each allpass filter together corresponding to a respective effective delay line position for each allpass filter; and crossfade instructions that generate an output signal that smoothly crossfades between the outputs of the first and second allpass filters, the output signal corresponding to a delay line read position that smoothly transitions from a first effective delay line position to a second effective delay line position.

12. The signal processing system of claim 11, wherein the control instructions include update instructions for updating the read pointer and filter coefficient of the first allpass filter and updating the read pointer and filter coefficient of the second allpass filter, in alternating fashion;

the crossfade instructions include instructions for smoothly and alternatingly crossfading between the outputs of the first and second allpass filters, and coordinating the updating of the allpass filter read pointers and filter coefficients with the crossfading step so that the output signal generated by the crossfading step smoothly transitions between successive effective delay line positions.

13. The signal processing system of claim 12, wherein the control instructions include updating instructions that update the first allpass filter's read pointer and filter coefficient, and the second allpass filter's read pointer and filter coefficient, in accordance with received delay length values;

the crossfade instructions include instructions for generating, after the first allpass filter's read pointer and filter coefficient are updated, an output signal corresponding to the output generated by the second allpass filter for a first number of sample periods, and then crossfading from the output generated by the second allpass filter to the output generated by the first allpass filter over a second number of sample periods.

14. The signal processing system of claim 13, wherein the filtering instructions establish an internal state within each of the first and second allpass filters and update the internal state of both the first and second allpass filters during each sample period of operation of the first and second allpass filters, such that the internal state of the first allpass filter is updated during each of the first number of sample periods.

15. The signal processing system of claim 12, wherein the update instructions updates the read pointer and filter coefficient of the first allpass filter and the read pointer and filter coefficient of the second allpass filter in accordance with received delay length values; and the read pointer and filter coefficient for each allpass filter, when updated, correspond to an integer portion and a fractional portion, respectively, of one of the received delay length values.

* * * * *